United States Pa[tent]
Borrelli 3,859,643
Jan. 7, 1975

[54] OPTICAL SENSING OF CYLINDRICAL MAGNETIC DOMAINS

[75] Inventor: Nicholas F. Borrelli, Elmira, N.Y.

[73] Assignee: Corning Glass Works, Corning, N.Y.

[22] Filed: Nov. 14, 1973

[21] Appl. No.: 415,525

[52] U.S. Cl. ..... 340/174 YC, 340/174 TF, 350/151
[51] Int. Cl. .......................................... G11c 11/14
[58] Field of Search ..................... 350/151, 96 WG; 340/174 YC, 174 TF, 174 SR

[56] References Cited

UNITED STATES PATENTS 3,806,903 4/1974 Myer .......................... 340/174 YC

*Primary Examiner*—Stanley M. Urynowicz, Jr.
*Attorney, Agent, or Firm*—William J. Simmons, Jr.; Clarence R. Patty, Jr.

[57] ABSTRACT

A cylindrical magnetic domain apparatus in which the presence or absence of a domain at a given point on the magnetic film is optically determined. One end of a single mode optical waveguide is disposed adjacent to the magnetic film at the given point. A plane polarized light beam is radiated into the other end of the waveguide, and the $HE_{11}$ mode, which is caused to propagate in the waveguide, preserves the linear polarization of the input light beam. Output means employing the Faraday effect is disposed adjacent to that side of the magnetic film opposite that at which the optical waveguide terminates. The output means receives light which radiates from the waveguide and passes through the magnetic film, and it provides an output signal that is indicative of the presence or absence of domains at the given point on the magnetic film.

11 Claims, 2 Drawing Figures

OPTICAL SENSING OF CYLINDRICAL MAGNETIC DOMAINS

BACKGROUND OF THE INVENTION

1. Field of the Invention

This invention relates to a cylindrical magnetic domain propagation apparatus and more particularly, to an improved sensing means for such domains.

2. Description of the Prior Art

It is well known that a magnetic domain may be bounded by a single wall. Such a domain has a direction of magnetization opposite to that of its surroundings, and a shape which is cylindrical. Devices utilizing these single wall domains, hereinafter referred to as bubble domains, are also known in the prior art. In these devices, propagation circuitry is located on the magnetic sheet or film in which the bubble domains are nucleated. Under the influence of the propagation circuitry, the bubble domains can be moved throughout the magnetic sheet. Generally, the selective movement of a bubble domain is achieved by generating a localized attracting field at a position which is offset from the position occupied by the bubble domain. Various types of propagation circuitry include conductor loops, permaloy T and I bars, herringbone structures and angelfish patterns. A description of many of these can be found in the Bell System Technical Journal, Vol. 46, No. 8, October 1967, on pages 1,901–1,925. Also, numerous patents, including U.S. Pat. Nos. 3,454,939; 3,460,116; 3,506,975 and 3,516,077, describe various propagation means and magnetic bubble domain devices.

In devices such as memories, displays and the like, which utilize bubble domains, means must be provided for sensing the presence and absence of these domains. For example, domains can be sensed inductively by a conductor loop, they can be sensed by magnetoresistive or Hall-effect devices, or they may be sensed optically by devices utilizing the Kerr and Faraday effects.

As attempts are made to increase the storage density of bubble domain devices, the size of the bubble domains must be decreased, and the total flux from the domains correspondingly decreases. Detection of the small magnetic signals associated with small bubble domains by some of the aforementioned detectors can be extremely difficult. In some instances small bubble domains are expanded to a size great enough to be detected by conventional techniques. Such expansion circuitry is undesirable since it increases the overall size of the bubble domain device. Therefore, as bubble domain devices are designed requiring domains of the order of 1 82 m in diameter to obtain higher storage densities and/or faster data rates, the mode of detection becomes a significant limiting design factor.

Optical techniques in general, are advantageous in that they provide good sensitivity, and they are not subject to electrical pickup and stray magnetic fields. It has been recognized that optical detection schemes based on the inherent Faraday effect can theoretically provide the resolution required to detect 1 $\mu$m domains with reasonable signal-to-noise ratios. An optical system utilizing a focused beam from a coherent source is disclosed in the publication "Detection of Cylindrical Magnetic Domains" by W. Strauss, Journal of Applied Physics, Vol. 42, pages 1,251–1,257 (1970). However, the focused-beam technique described in this publication requires a lens near the garnet film surface. This lens would have to maintain rigid registration with the bubble propagation pattern. The registration of a lens system in a bubble domain device employing domains of the order of 1 $\mu$m in diameter would be extremely difficult.

SUMMARY OF THE INVENTION

It is an object of the present invention to provide a detector capable of detecting bubble domains as small as about 1 $\mu$m in diameter.

Another object is to provide an optical bubble domain detector which requires no optical elements such as lenses and polarizers near the magnetic film surface.

Briefly, the present invention relates to a cylindrical magnetic domain propagation system comprising a magnetic film in which domains can be propagated. Such a system includes drive field means for moving the domains in a channel extending along the film and sensing means associated with the channel for sensing the presence and absence of domains at a given point along the channel. The sensing means is characterized in that it comprises a single mode optical waveguide having input and output ends, the output end being disposed adjacent to the magnetic film at the given point so that light radiating from the waveguide passes through the film at that point. Means are provided for radiating a beam of plane polarized light into the input end of the waveguide. Output means are disposed on that side of the magnetic film opposite the waveguide in light receiving relationship therewith for providing an output signal that is indicative of the presence or absence of domains at the given point.

DESCRIPTION OF THE PREFERRED EMBODIMENT

Figure 1:
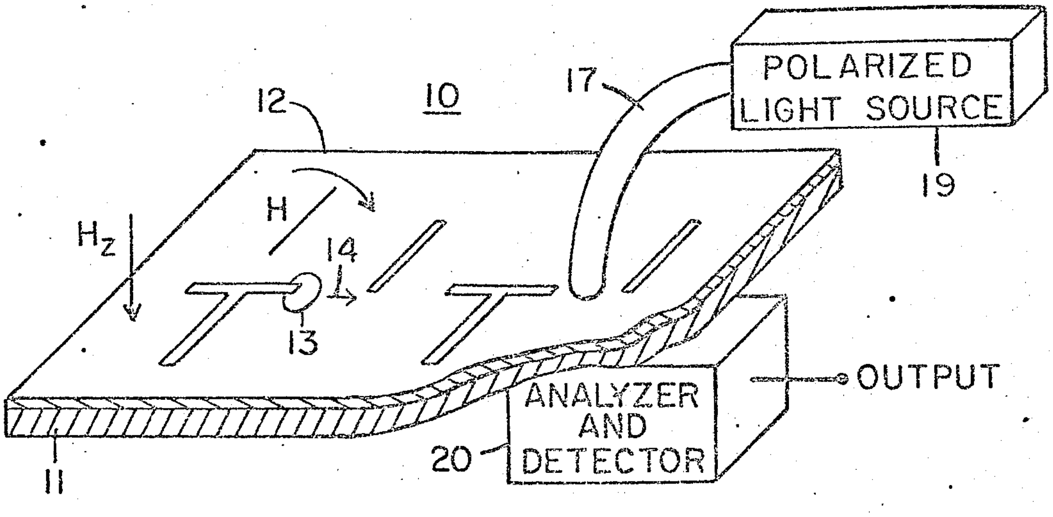
FIG. 1 is an oblique view of a bubble domain propagation device incorporating the optical detector of the present invention.

FIG. 1 shows a domain propagation arrangement 10 including the domain detection means of the present invention. Arrangement 10 comprises a transparent substrate 11 on which is deposited a magnetic sheet or film 12 of any material that will sustain bubble domain propagation. Examples of such materials include orthoferrites and garnets. Specifically, a garnet film of $[EuYbGd]_3(FeGa)_5O_{12}$ may be deposited by liquid phase epitaxy on a single crystal substrate of $Gd_3Ga_5O_{12}$. Other suitable materials are disclosed in U.S. Pat. No. 3,728,153 issued to D. M. Heinz. The propagation means illustrated in FIG. 1 is a T and I bar pattern comprised of soft magnetic material such as permalloy deposited on film 12. The bubble domain detection means of the present invention is equally applicable to other types of propagation means. A bias field $H_z$ is applied in a direction normal to magnetic film 12 by such conventional means as a permanent magnet or a coil surrounding film 12. Under the influence of a rotating, in-plane magnetic drive field H, bubble domains such as domain 13, move in the direction of arrow 14 in a channel extending along film 12. As used herein the term "channel" includes any path along which a domain can propagate. Domain propagation arrangement 10 may include two or more such channels, each of which may include separate domain sensing means.

A necessary part of bubble domain devices is a detector for ascertaining the presence of a bubble as it passes or stops at a given point during its propagation along a channel in film 12. In accordance with the present invention, bubble detection is accomplished by disposing the output end of single mode optical waveguide 17 adjacent to a point on film 12 through which bubbles are propagated. A beam of polarized light is coupled to the input end of waveguide 17 by source 19, which may comprise a laser or light emitting diode in combination with a polarizer and any required optical components for coupling the light into the input end of waveguide 17. The waveguide must be operated in the $HE_{11}$ mode as a single mode waveguide so that the polarization direction is preserved as the light propagates therethrough. An optical waveguide capable of transmitting only the $HE_{11}$ mode is described in U.S. Pat. No. 3,711,262 issued to D. B. Keck et al. Such single mode operation can be obtained by maintaining the core diameter in accordance with the equation $$d \leq (2.4\ \lambda/\pi)\ (n_1^2 - n_2^2)^{-1/2}$$

where $\lambda$ is the wavelength of the light propagating in the guide and $n_1$ and $n_2$ are the refractive indices of the core and cladding, respectively. Disposed on the side of substrate 11 opposite waveguide 17 are analyzer and detector 20 from which an output signal is provided.

Figure 2:
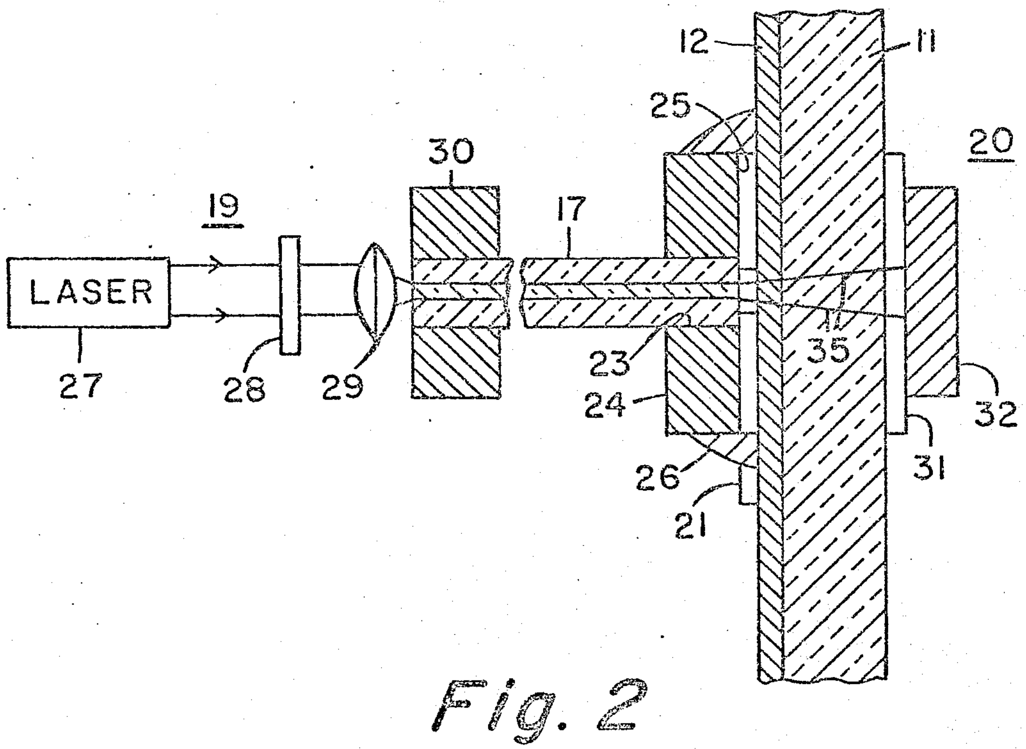
FIG. 2 is a cross-sectional view of a domain propagation device similar to that of FIG. 1, the domain detection system being illustrated in greater detail in FIG. 2.

The detection of small bubble domains utilizing an optical waveguide involves bringing the output end of the waveguide into contact with magnetic film 12 to maintain the spatial resolution determined by the diameter of the waveguide core, since the light beam diverges slightly as it radiates from the output end of the waveguide. A suitable waveguide mounting arrangement is illustrated in FIG. 2 which also shows source 19 and detector 20 in greater detail. The axis of that portion of waveguide 17 which terminates at the output end is preferably disposed perpendicular to the surface of film 12 by mounting it in hole 23 extending through mounting plate 24. After securing the waveguide in hole 23 with the output end thereof substantially coplanar with surface 25 of plate 24, that surface is ground and polished to assure that the output end is flush with the mounting plate surface. It is preferred that plate 24 be made of glass, brass or some other material that has grinding characteristics similar to those of the waveguide material. The mounting plate is then pressure mounted against film 12 so that the spacing therebetween is maintained less than about 5 $\mu$m, and a bead 26 of bonding material is disposed around the periphery of plate 24 to secure it to film 12. A portion of T bar 21 is disposed between the mounting plate and film 12.

Light source 19 may consist of laser 27 and polarizer 28, the combination of which is suitable for directing a narrow beam of plane polarized light onto the core of waveguide 17 at the input end thereof which is disposed in support means 30. It may be desirable to include in the light source a lens system such as that represented by lens 29, especially if the waveguide core diameter approaches 1 $\mu$m.

Light radiated from waveguide 17 constitutes an input beam 35 which propagates through film 12, substrate 11 and analyzer plate 31 to an optical detector 32. In the absence of a bubble under the waveguide core, the angle of the plane of polarization of the input light beam will be rotated by the angle $\theta$ due to the Faraday effect, $\theta$ being given by $$\theta = F_s t$$

where $F$ is the Faraday constant of the magnetic film in deg/cm and $t$ is the film thickness. If a bubble is under the core, the rotation will be equal in magnitude, but since the magnetization is reversed the rotation will be of the opposite sense. Hence, by rotating the analyzer 31 so that a null is obtained at the no bubble condition, a $2\theta$ rotation is obtained in the presence of a bubble. Analyzer plate 31 could also be angularly oriented so that a dark bubble is produced on a bright background.

I claim:

1. In a cylindrical magnetic domain propagation system comprising
 a magnetic film in which said domains can be propagated,
 drive field means for moving said domains in a channel extending along said film, and
 sensing means associated with said channel for sensing the presence and absence of domains at a given point along said channel,
said sensing means being characterized in that it comprises
 means for radiating a beam of plane polarized light of wavelength $\lambda$,
 a single mode optical waveguide capable of transmitting light in only the $HE_{11}$ mode at said wavelength $\lambda$, said waveguide having input and output ends, said input end being disposed in light receiving relationship with respect to said beam of plane polarized light, said output end being disposed adjacent to said magnetic film at said given point so that plane polarized light radiating from said output end passes through said film at said given point, and
 output means disposed on that side of said magnetic film opposite said waveguide in light receiving relationship therewith for providing an output signal that is indicative of the presence or absence of domains at said given point.

2. A domain propagation system in accordance with claim 1 wherein said means for radiating comprises a laser so disposed with respect to the input end of said waveguide that light therefrom impinges upon the end of said waveguide, and means disposed between said laser and said waveguide for polarizing said laser light.

3. A domain propagation system in accordance with claim 1 wherein that portion of said waveguide which terminates at said output end is substantially perpendicular to said film.

4. A domain propagation system in accordance with claim 1 wherein said output means comprises an analyzer plate disposed in receiving relationship with respect to light that has radiated from said waveguide and passed through said magnetic film, and an optical detector disposed adjacent to said analyzer plate.

5. A domain propagation system in accordance with claim 1 further comprising a mounting plate, means defining a hole through said mounting plate, said output end of said waveguide being disposed in said hole in such a manner that said output end of said waveguide is coplanar with one surface of said plate, said one surface of said plate being mounted on said magnetic film.

6. A cylindrical magnetic domain propagation system comprising a transparent substrate, a magnetic film disposed on said substrate, said film being of the type in which cylindrical magnetic domains can be propagated, means for moving said domains in a channel extending along said film, means for radiating a beam of plane polarized light of wavelength λ, a single mode optical waveguide having a core of transparent material having a diameter $d$ and a refractive index $n_1$ and a layer of transparent cladding material disposed on the surface of said core, the refractive index $n_2$ of said cladding material being lower than $n_1$, the diameter $d$ of said core being defined by the equation $$d \leq (2.4 \lambda/\pi)(n_1^2 - n_2^2)^{-1/2}$$

said waveguide being capable of transmitting light in only the $HE_{11}$ mode, said waveguide having input and output ends, said input end being disposed in light receiving relationship with respect to said beam of plane polarized light, said output end being disposed adjacent to said magnetic film at said given point so that plane polarized light radiating from said output end passes through said film at said given point, and output means disposed on that side of said substrate opposite said waveguide in light receiving relationship therewith for providing an output signal that is indicative of the presence or absence of domains at said given point.

7. A cylindrical magnetic domain propagation system in accordance with claim 6 wherein said means for radiating comprises a laser so disposed with respect to the input end of said waveguide that light therefrom impinges upon the end of the core of said waveguide, and means disposed between said laser and said waveguide for polarizing said laser light.

8. A cylindrical magnetic domain propagation system in accordance with claim 7 wherein said means for radiating further comprises a lens system for focusing light from said laser onto the core of said waveguide.

9. A cylindrical magnetic domain propagation system in accordance with claim 8, wherein that portion of said waveguide which terminates at said output end is substantially perpendicular to said film.

10. A domain propagation system in accordance with claim 9 wherein said output means comprises an analyzer plate disposed in receiving relationship with respect to light that has radiated from said waveguide and passed through said magnetic film, and an optical detector disposed adjacent to said analyzer plate.

11. A domain propagation system in accordance with claim 10 further comprising a mounting plate, means defining a hole through said mounting plate, said output end of said waveguide being disposed in said hole in such a manner that said output end of said waveguide is coplanar with one surface of said plate, said one surface of said plate being mounted on said magnetic film.

* * * * *